(12) United States Patent
Schleh

(10) Patent No.: US 6,401,600 B1
(45) Date of Patent: Jun. 11, 2002

(54) DEVICE FOR PREPARING FOODSTUFFS

(76) Inventor: Rudolf Schleh, Kurfuerstenstrasse 8, 69234 Dielheim (DE)

( * ) Notice: Subject to any disclaimer, the term of this patent is extended or adjusted under 35 U.S.C. 154(b) by 0 days.

(21) Appl. No.: 09/445,148

(22) PCT Filed: May 30, 1998

(86) PCT No.: PCT/EP98/03247
§ 371 (c)(1),
(2), (4) Date: Dec. 3, 1999

(87) PCT Pub. No.: WO98/55011
PCT Pub. Date: Dec. 10, 1998

(30) Foreign Application Priority Data

Jun. 6, 1997 (DE) .......................... 197 23 754

(51) Int. Cl.$^7$ ................................ A47J 37/04
(52) U.S. Cl. ................. 99/329 R; 99/356; 99/357; 99/476; 99/479
(58) Field of Search ................ 99/334, 352, 356, 99/427, 476, 325, 329 R, 329 P, 329 RT, 357, 407, 479

(56) References Cited

U.S. PATENT DOCUMENTS

| | | |
|---|---|---|
| 3,448,677 A | 6/1969 | Dexters |
| 4,572,404 A | 2/1986 | Cheeseman |
| 5,325,766 A * | 7/1994 | Mareels ........................ 99/357 |
| 5,404,797 A | 4/1995 | Millar |
| 5,417,148 A * | 5/1995 | Cavallo ........................ 99/334 |
| 5,556,000 A * | 9/1996 | Covington et al. ..... 221/150 A |

FOREIGN PATENT DOCUMENTS

| | | |
|---|---|---|
| EP | 0 462 354 | 12/1991 |
| EP | 0 608 463 | 8/1994 |
| EP | 0 636 334 | 2/1995 |
| EP | 0 755 031 | 1/1997 |
| FR | 2 597 319 | 10/1987 |
| WO | 93 21809 | 11/1993 |

OTHER PUBLICATIONS

Wayne Gisslen, Professional Cooking 3$^{rd}$ Edition, John Wiley & Sons Inc., p. 59, 1995.*

* cited by examiner

*Primary Examiner*—Keith Hendricks
*Assistant Examiner*—Drew Becker
(74) *Attorney, Agent, or Firm*—Browdy and Neimark, P.L.L.C.

(57) ABSTRACT

A device for the processing of foods, which has a storage container 1 for receiving foods. The storage container 1 is connected, via an outlet opening 20, to an opening 4 of a preparation container 2 which can be closed by a third closing element 3 during the preparation of the foods. The outlet opening 20 of the storage container 1 can be closed by a first closing element 8, which can be moved into an opened and/or closed position by an actuator 14 as a function of a control variable or an amount of food. Only after the preparation of the foods is the preparation container 2 connected, via at least one opening 4, to a collecting container 7, which can be removed by an operator.

21 Claims, 7 Drawing Sheets

DEVICE FOR PREPARING FOODSTUFFS

The invention relates to a device for the processing of foods.

A device is already known from French Patent No. 2,597,319 A1 which permits the preparation or deep-frying of French fries, whereby the frozen French fries are taken out of a storage container and conveyed to the preparation container via a metering device or scales. In the preparation container, the French fries are cooked in fat in the conventional manner and, after an appropriate preparation time, removed from the preparation container. In this case, the storage container is connected, via an outlet opening, to an opening of a preparation container that can be closed by a third closing means. The outlet opening of the storage container can be closed by a first closing means, which can be moved into an opened and/or closed position by means of an actuator as a function of a control variable or an amount of food. The preparation container is connected via at least one opening to a collecting container.

Accordingly, the object of the invention consists in creating a device for the processing of foods by means of which foods, in particular frozen foods such as, for example, French fries, can be prepared more quickly and gently, and brought into an edible state and then dispensed to an operator.

The object is achieved by the following characteristics:

The device has a storage container for receiving foods. The storage container is connected, via an outlet opening, to an opening of a preparation container which can be closed by a third closing means during the preparation of the foods. The outlet opening of the storage container can be closed by a first closing means, which can be moved into an opened and/or closed position by means of an actuator as a function of a control variable or an amount of food. The preparation container is connected to a pressure-increase device as well as a supply device for water or another substance or liquid and, only after the preparation of the foods is the preparation container connected, via at least one opening, to a collecting container, which can be removed by an operator.

Through the advantageous configuration of the device for the processing of foods, it is possible to store, for example, frozen French fries in a refrigerated container until they are removed and then to process them by means of this device in such a way that the operator can remove the French fries for consumption. For this purpose, the French fries are stored in a refrigerated container and then, at the push of a button, they are automatically fed via a feeding device and a metering device to a preparation container. Through the advantageous configuration of the metering device, it is possible to feed the French fries or else other foods to the preparation container. In the preparation container, the foods are heated up, for example, the French fries, which can be pre-fried, are treated once again in such a way that they are suitable for consumption. After the processing of the foods, they are fed automatically to a container, so that they are now dispensed to the operator for consumption. Thus, by means of this device for the processing of the foods, foods that have already been pretreated such as, for example, French fries, can be stored in the container up to the time when they are to be removed from the container by an operator. Since the device is fully automatic, the operator who wants to remove the foods from the device needs only to operate a single push button, by means of which the entire operation for processing the foods is controlled. For this purpose, it is advantageous for the storage container to be incorporated in an insulated housing that is maintained at the desired freezing temperature by means of a refrigerating unit. In an advantageous way, this storage container serves to receive the foods—for example, the French fries. Thus, when the operator wishes to remove the French fries from the device, he or she operates a push button for this, which controls the operation of the device. After actuation of the push button, first of all, the opening in the supply container is opened and the French fries can be fed through this opening to a conveying device, which then conveys the French fries to a metering device—for example, a set of scales. Once a specific amount has been received in an intermediate container, a flap that is a part of the metering device opens another opening and feeds the foods, via an outlet opening of the refrigerated container, to a preparation container, which can advantageously be equipped with a heater. The opening of the refrigerated container, which is closed by means of a gate or a flap, only opens once the closing means in the preparation container is opened. Subsequently, the flap in the refrigerated container also opens and the foods or the French fries are now fed to the preparation container and processed by means of a heater, either heated up, baked, or roasted, or brought into an edible state.

After this operation, the preparation container can rotate, for example, by 180° until the opening is situated above a collecting container and the foods can be deposited into this collecting container. For this purpose, the collecting container is passed under the opening of the preparation container at specific intervals in a cycle. After this operation, the operator can remove the collecting container and consume the food. Thus, by means of this device, foods can be processed in a simple and very fast way—for example, between 30 and 60 seconds—and then dispensed for consumption. A device of this kind is suitable, in particular, for French fries that have already been pre-fried and that merely have to be treated once again in the preparation container. Depending on the control of the operating sequences, however, it is also possible to cook, heat up, or bring other foods into an edible state without any problem using a device of this kind. This process employs an appropriate software program, which, depending on the kind of foods being prepared, controls the operating sequence of the device for the processing of the foods.

Furthermore, it is advantageous for the first closing means, which is provided before the opening of the preparation container, to be configured as a metering device and to serve to portion out the foods that are fed to the preparation container. Since a metering device is associated with the preparation container, the foods can be portioned out in a simple way and then fed to the preparation container.

For this purpose, it is advantageous for the first closing means, which is provided before the opening of the preparation container, to be configured as a set of scales consisting of a flap arranged in a pivoting manner on an axis and a lever arm connected to the flap, this lever arm being connected to a drive device. In a simple way, the metering device can be configured as a set of scales, in particular as a flap, on which a specific amount of French fries is held until a specific filling amount has been reached. Once this filling amount is reached, the scales, configured as a flap, are pivoted and moved to the outlet opening. For this purpose, the collecting container and the scales are advantageously situated in an insulated housing, which is equipped with a refrigerating unit.

In an advantageous way, the drive device has a cam wheel, which is operatively engaged with the lever arm via a connecting piece.

Finally, in a preferred embodiment of the solution according to the invention, it is provided that the actuator is associated with the first closing means, whereby said actuator effects a shift of the flap to an opened position in response to a specific filling amount of the food and in response to a control variable resulting therefrom, and, after the foods have been discharged, said actuator effects a shift to a closed position, and it is provided that the closing means has a lever arm, whereby there is a weight corresponding to the filling amount on the lever arm of the flap.

In connection with the configuration and arrangement according to the invention, it is advantageous for the lever arm to be connected, via a flexibly configured controlling element, to a two-position switch, which can only be activated when the flap has reached its end position or closed position. In this way, it is ensured that the flap can only be moved back into a closed position again once the filling amount, for example, the French fries, has been completely removed from the flap. If, for example, French fries fall between the outer edge of the flap and the opposite wall of the flap, causing the flap to jam or preventing it from being moved into a completely closed position, then the flap can be moved into an opened position once again by means of its adjustment mechanism, and thus the remaining amount of the food can also be removed from the flap.

For this purpose, it is advantageous for the connecting piece provided between the drive device and the lever to be configured as a spring element, which is designed in such a way that, at a specific amount of weight, the flap can be shifted to an open position.

In addition, it is advantageous for the preparation container to have an adjustable third closing means, which can be moved into a closed or opened position by means of a motor, and for the third closing means of the preparation container to be operatively engaged with a second closing means, by which the opening of the preparation container can be closed.

Furthermore, it is advantageous for the second closing means of the storage container to be connected to the closing means of the preparation container via a control element, and for a driving motor to be connected to the third closing means via the control element and automatically with the second closing means via a connection that allows play, or else via the actuator. By means of the automatic connection between the closing means at the outlet opening of the collecting container or of the refrigerated housing and the opening of the preparation container, it is ensured that the French fries can only pass through the outlet opening of the refrigerated housing once the opening of the preparation container is in an opened position, that is, only once the associated closing means has been shifted to such a wide position that the French fries can pass through the opening of the preparation container. In this way, it is prevented that the French fries leave the outlet container or the refrigerated housing too soon and fall onto the closed flap of the preparation container.

In a further embodiment of the invention, it is advantageous for a transport device to be provided before the metering device, this transport device being operatively engaged with a drive device that feeds the foods to the metering device. By means of the transport device, which is situated before the metering device, a specific filling amount, depending on the design of the transport device, is already fed to the metering device, which only then opens up and switches off the transport device of the feeding device once a specific filling amount has collected on the metering device or on the flap.

For this purpose, it is advantageous for the storage container and the metering device as well as the transport device to be provided in an insulated housing or refrigerated housing. This arrangement ensures that the foods remain refrigerated for as long as possible, namely, up to the time when the French fries, for example, are fed to the preparation container.

In a further embodiment of the invention, it is advantageous for the refrigerated housing to be closable by an insulated closing means or by the second closing means. Since the closing means also has an insulated construction, a perfect refrigeration of the foods in the refrigerated container or in the refrigerated housing is ensured.

An additional possibility on the basis of another configuration of the device according to the invention consists in that there is a receiving space provided between the metering device and the insulated closing means or the second closing means. By means of the second receiving space provided in the refrigerated space, the foods, which have already been portioned, can be stored temporarily up to the time when the closing means in the subsequent preparation container has been moved into an open position. For this purpose, it is advantageous for the third closing means of the preparation container to be opened first and then, with a time delay, for the second closing means of the refrigerated housing and/or of the receiving space be opened by the automatic guide.

An essential advantageous embodiment is achieved in that the preparation container can be driven by means of a drive device. In this way, the foods can be processed perfectly and it is prevented that they clump together during the processing operation, for example, and thus do not exhibit the desired quality.

A perfect processing of the foods is achieved in that the preparation container can be heated by a heater, depending on the product or the French fries held therein, and it is connected to a pressure-increase device and/or a device for supplying water or another substance or liquid. By means of the pressure-increase device, an improvement in the processing of the foods is ensured. Through the supply of liquid, the operation for processing the French fries is considerably accelerated and improved, in particular if they are frozen.

In accordance with a further configuration of the device of the invention, an additional possibility is to provide the drive device with a control device for influencing the running time and/or the driving speed of the preparation container and to cause the opening to be automatically opened after the processing of the foods by means of the preparation container and to cause the collecting container with the foods to be emptied.

Finally, in a preferred embodiment of the solution according to the invention, it is provided that the device has a holder in which several collecting containers or containers for receiving foods can be stacked, that, in the area of the holder or of a discharge opening of the holder, there is at least one holding element, which secures the collecting container in the holder, and that, in the area of the discharge opening of the holder, there is a separating part, which separates at least one collecting container from the other collecting containers held in the holder in such a way that the collecting container can be moved into a position for receiving the product or foods.

For this purpose, it is advantageous for the holding element and the separating part to be arranged on an axis of rotation and to be driven together by means of a drive device.

In conjunction with the configuration and arrangement according to the invention, it is advantageous for the holding element and the separating part to consist of two rotational bodies connected to each other, both of which can be driven by means of the drive device, and for the upper separating part of the two rotational bodies to be configured essentially in a circular shape, and for one part of this circular-shaped rotational body to be cut off in a segment-like manner in the area of its outer circumference.

For this purpose, it is advantageous for the collecting container to have a holding rim, under which the holding element of the upper rotational body can be placed, and for the holding rim to display a width $R_1$, which corresponds approximately to the width $A_1$ of the segment-like section.

Furthermore, it is advantageous for the collecting container to have a holding rim, under which the holding element of the lower rotational body can be moved, and for the holding element of the upper rotational body to be offset by an angle of between 45° and 230° or by 180° with respect to the holding element of the lower rotational body. By means of the device for receiving the collecting containers, it is ensured that they can be held in a holder up to the time when an appropriate collecting container is to be moved under the opening of the discharge opening of the preparation container. In an advantageous manner, the holder consists of a holding part, which is placed under the rim of a collecting container and restrains the lowest collecting container as well as the additional collecting containers stacked above it in the holder. If the lower collecting container, for example, is now to be separated from the others, then the holding element is rotated by at least 180°, so that the segment-like section of the holding element is rotated into the area of the collecting container, the lower rim of the collecting container is released, and this collecting container can drop downwards. At the same time, the upper holding element is once again moved into an appropriate position, so that the collecting container situated above it is held automatically up to the time when it is to be moved into a receiving position. This is advantageously achieved by providing the two rotational bodies, each offset by 180°, with a corresponding segment-like section or cutout, each of which successively ensures that the lowest discharge container can be discharged downwards.

In a further embodiment of the invention, in order to receive the collecting containers, it is advantageous for the device to have a receiving table, a turntable, or a receiving table with conveying elements in the area of the discharge opening of the holder, on which the collecting containers can be placed and can be moved, one after the other, under the opening or the discharge area of the preparation container, and it is also advantageous for an additional holder or a housing for receiving collecting containers, in which condiments or seasonings can be held, to be associated with the receiving table or the turntable.

Furthermore, it is advantageous, in the holder or in the housings for receiving collecting containers, for at least one separating element or an agitating part to be provided, by means of which the collecting containers can be separated from one another.

In order for the individual collecting containers to be filled only stepwise, that is, as the need arises, under the opening of the preparation container, it is advantageous for these containers to be moved along by means of a rotating receiving table.

The receiving table can also be designed so as to be stationary, whereby, on the receiving table, there are conveying elements that ensure the further transport of the individual collecting containers to the opening of the preparation container. For this purpose, the receiving table can be configured as a turntable or can have appropriate conveying elements that rotate above the receiving table and bring the individual collecting containers into the desired receiving position, so that they can be filled, for example, with French fries. Adjacent to the first collecting container, it is possible to provide a second holder in which there are prepared containers that serve for receiving seasonings, for example, mustard or ketchup. In order to prevent the individual containers in the holders from jamming, they can be provided with one or several separating or agitating parts, which cause the collecting containers, which can be configured, for example, as spheres, to simply be kept loosely in the holder until they are conveyed to the operator via a discharge opening.

For this purpose, it is advantageous for the foods or the French fries that are present in the storage container to be fed via an opening of the metering device, which feeds a specific filling amount, via the outlet opening of the preparation container, to the closing means, which can only be shifted to an open position once the closing means of the preparation container has been moved into an open position. The foods or the French fries are brought into an edible state in the preparation container, with admission of water and a simultaneous increase in pressure, whereby, after preparation of the foods, they are discharged to a collecting container, for the filled collecting container to be separated from the next collecting container by means of a separating device and placed on a receiving table, and for an operator to then be able to remove it.

Further advantages and details of the invention are elucidated in the patent claims and in the description and shown in the figures.

The following is shown.

Figure 1:
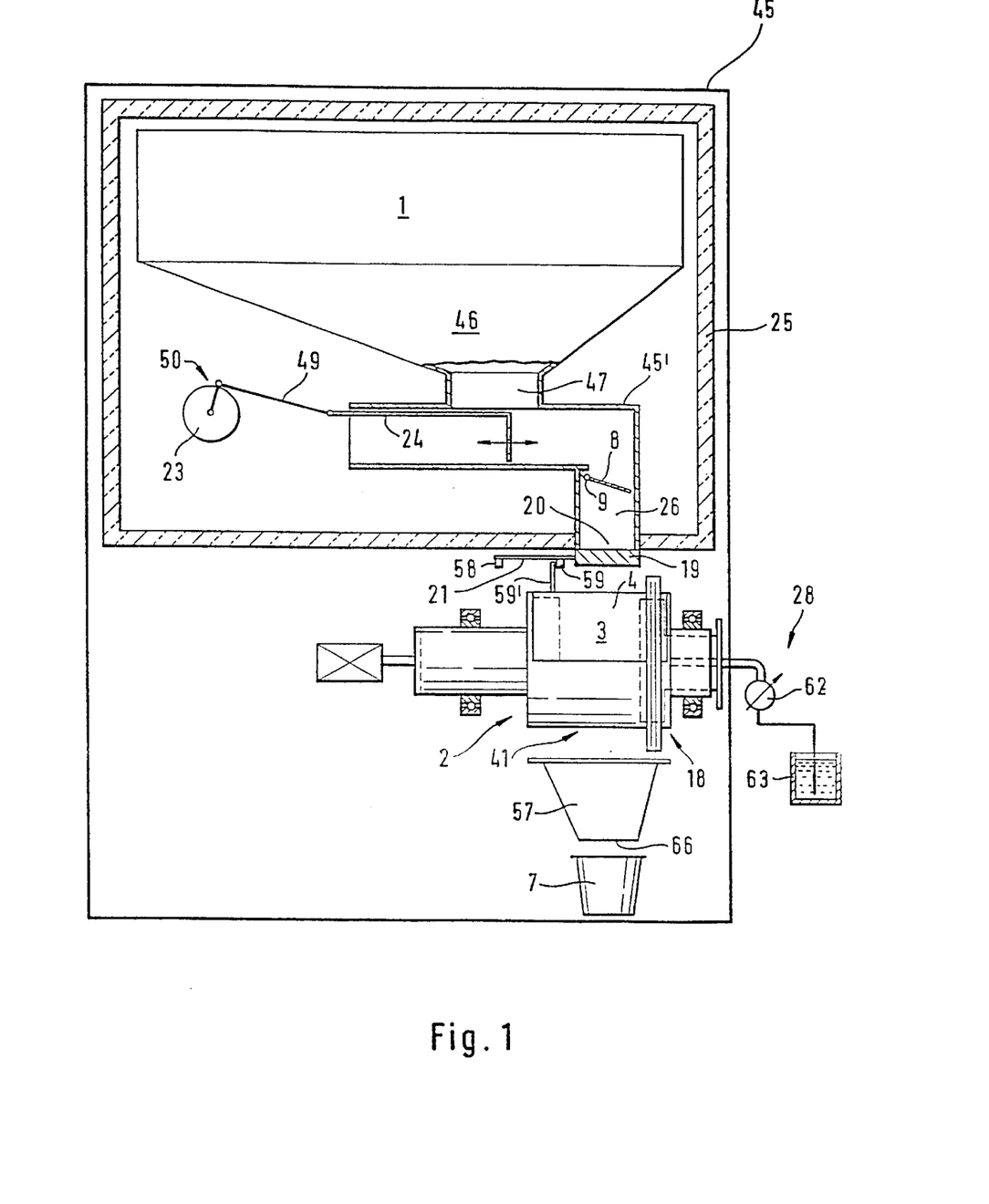
FIG. 1 an overall view of the device for the processing of foods, in particular French fries, having a refrigerated container and a device for the preparation of French fries as well as a discharge device for receiving collecting containers in which the French fries are received.

The drawing in FIG. 1 shows a device for the processing of foods or frozen foods, in particular French fries, comprising a refrigerating unit or refrigerated housing 25, which is provided in a housing 45 and is insulated on all sides in such a way that the foods in the refrigerated housing can be brought to the required freezing temperatures in order to store them for a prolonged period of time. For this purpose, the refrigerated housing 25 is surrounded by insulation material on all sides. Inside the refrigerated housing 25, there is a storage container 1, which consists of an upper, approximately rectangular part to which is adjoined a funnel-shaped part 46, which is provided with an outlet opening 47. The outlet opening can be closed, at least partly, for a certain length of time with a closing means, designed as a transport device 24, so that the foods, in particular French fries, are not crushed.

As shown in FIG. 1, the transport device 24 is situated in a housing 45', into which the transport device 24 can be moved from a left-hand position, shown in FIG. 1, to a closed position and, for this purpose, the outlet opening 47 can be closed at least partially, whereby, in the end position or closed position, a gap of approximately 5 to 10 cm can remain.

The transport device 24 is driven by means of a drive device 50 via a rod assembly 49.

Figure 2:
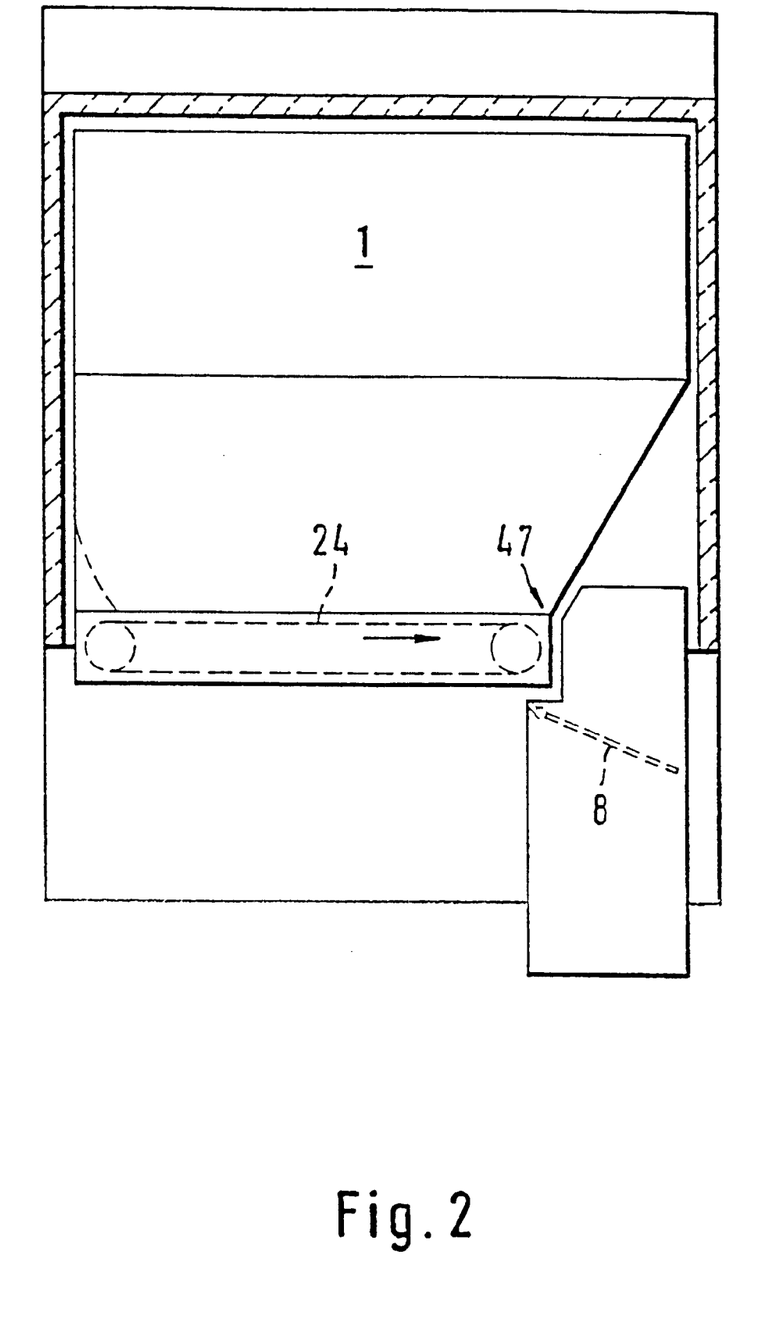
FIG. 2 a side view similar to FIG. 1 but with a conveyor belt.

Since the transport device 24 consists of an angle-shaped element, in the right-hand position, it can close the opening 47, on the one hand, and, in a different position, it can free the opening 47 and then—for example, from the left-hand position—feed the product that was discharged via the opening 47 into the housing 45' to another closing means 8, which can be configured, for example, as a metering device or a flap or a set of scales. As shown in FIG. 2, instead of the conveying device 24, it is also possible to provide a conveyor belt on which the foods are discharged through the outlet opening 47 of the container 1, so that they can then be fed to the metering device 8 by means of the conveying device 24. For this purpose, in the container 1, the outlet opening 47 is situated above the conveyor belt 24. The conveying device 24 as shown in FIGS. 1 and 2 is driven by a drive device 50 and a motor that is not shown in the drawing. Once a specific amount of the food has collected on the metering device 8, the metering device or the flap 8 opens, pivots downward out of the way, and conveys the foods into a receiving space 26.

Figure 3:
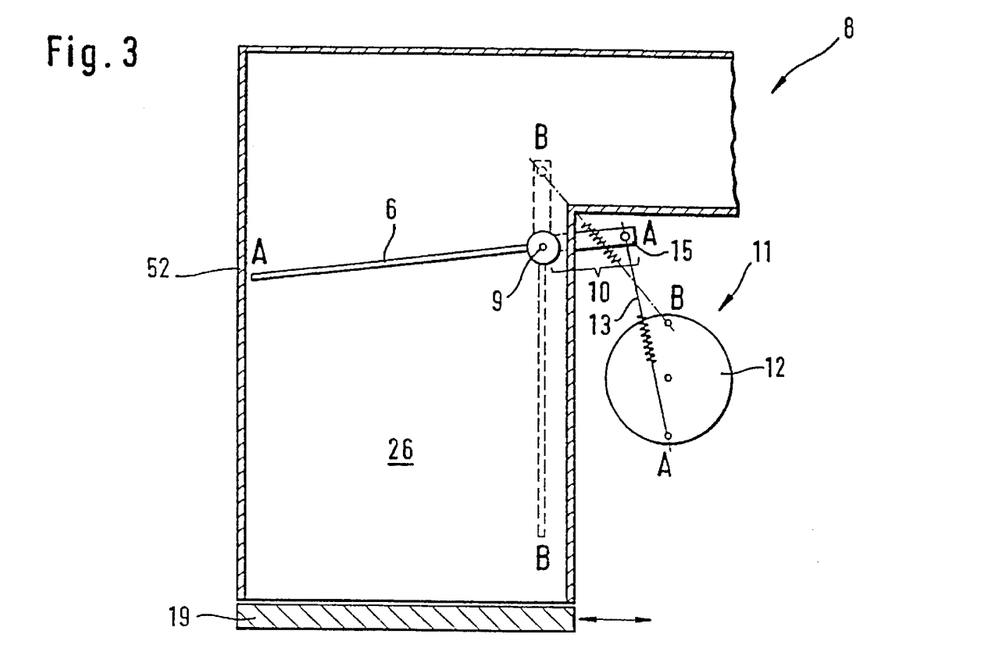
FIGS. 3 and 4 two views of the metering device or the scales for portioning out the foods or the French fries.
Figure 4:
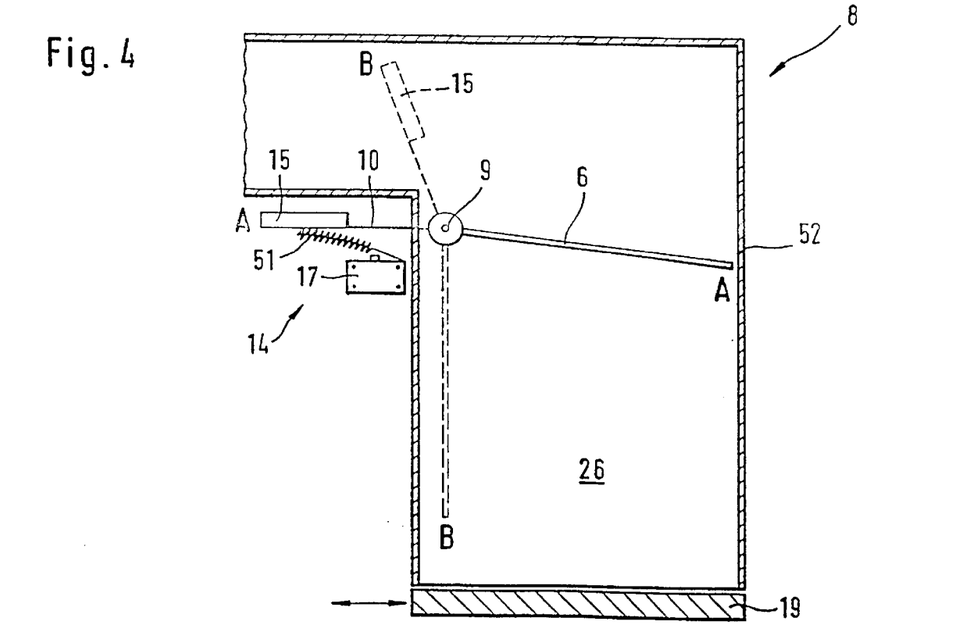

As shown in FIG. 3, the metering device 8 is configured as a set of scales and, in the following description, it is also designated as the first closing means, since it performs several functions.

The first closing means 8, as already mentioned, also serves as a metering device for portioning out the foods or the French fries, which can be fed to a preparation container 2 described below. In FIG. 3, the first closing means 8 consists of a flap 6, which is arranged in a pivoting manner on an axis 9. Connected to the flap 6 is an adjustable counterweight 15, which corresponds approximately to the filling amount that is to be fed into the preparation container 2. For example, once a specific filling amount or food, which corresponds to the weight 15, has been deposited on the flap 6, then said flap 6 pivots counterclockwise, as shown in FIG. 3, and discharges the French fries, for example, into the following receiving space 26. Furthermore, the flap 6 or the counterweight 15 is connected, via a spring or a connecting piece or rod assembly 13 that allows play, to a drive device 11, which has a cam wheel 12 with which a driving motor that is not shown in the drawing is associated. Furthermore, below the counterweight 15, there is an actuator 14 or a two-position switch 17 with a spring element 51, which, at a specific position of the weight 15, retracts the spring from the two-position switch 17 and thus closes the electrical circuit, so that the drive device 11 can pivot the flap 6 away from the position shown by solid lines to a position shown by broken lines. Now the filling amount or the foods or the French fries can be discharged into the receiving space 26, which is closed by a second closing means 19. After the filling amount has been discharged into the collecting container 26, the cam wheel 12 shifts the flap 6 to its closed position by means of the rod assembly 13 as shown in FIG. 3.

However, it can happen that a few French fries, for example, remain trapped in the outer area of the flap 6 and in a wall part 52 of the receiving space 26, so that the flap cannot assume its final closed position. Since the connecting element 13 is configured as a spring element, the flap 6 is pressed upward, but not enough to press the spring element 51 against the two-position switch 17. As long as the two-position switch maintains its closed position and does not interrupt the electrical circuit, the drive device 11 continues to rotate, opens the flap 6 once again, and thereby brings about the final discharge of all French fries from the flap 6. Now, the flap can assume its closed position by means of the drive device 11, so that, via the weight 15 or a lever arm 10, the spring 51 activates the two-position switch 17, opens the electrical circuit, and thereby switches off the drive device 11. The product present in the receiving space 26 is stored in the meantime until the next processing of the product or until the activation of the drive device 23.

As shown especially in FIGS. 1 and 3, the closing means 19 is also made up of an insulated part, which ensures that good refrigeration can be maintained in the refrigerated housing 25 and in the storage container 1. Thus, for example, once the French fries have reached the receiving space 26, then the third closing means 3 of the preparation container 2 is now moved into the opened position.

Figure 5:
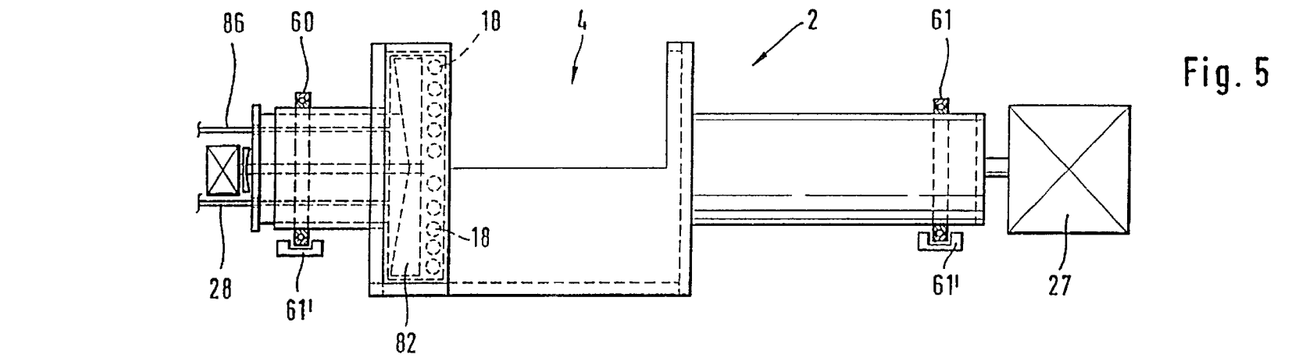
FIGS. 5 and 6 two different views of the preparing device for treating the foods or the French fries, with the associated drive device for rotational movement of the preparing device or for adjusting the closing means.
Figure 6:
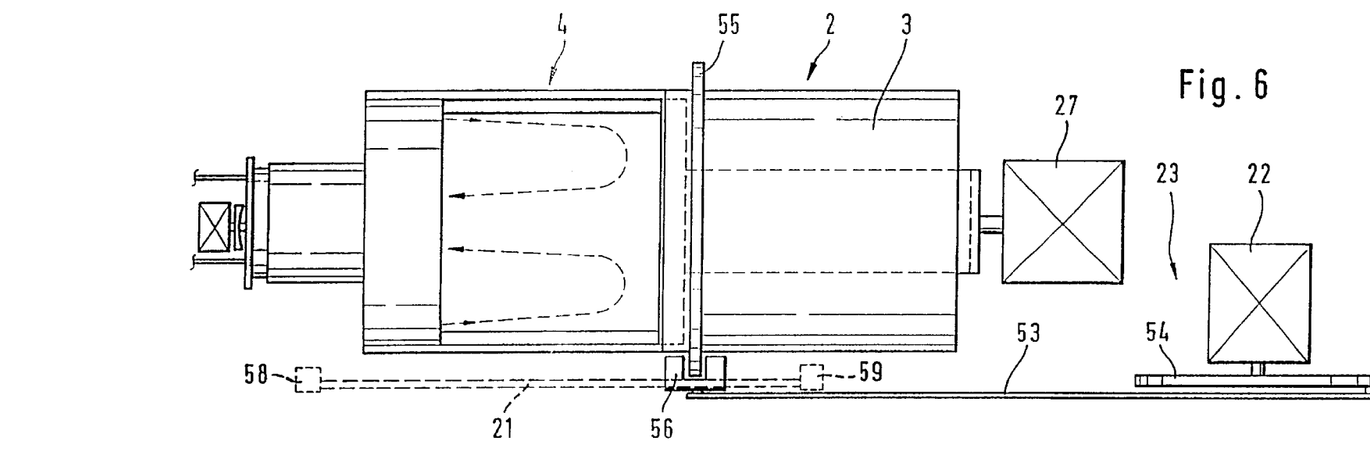

The closing means 3 and the preparation container 2 are shown in greater detail in FIGS. 5 and 6. The closing means 3 consists of a cover configured with a cylindrical or semicircular shape, which can cover an opening 4 of the preparation container 2 when the latter the latter has been shifted from the position shown in FIG. 6 to a left-hand position. For this purpose, the closing means 3 or the cover is connected, via a rod assembly 53 and a cam wheel 54, to a drive device 23, which, after a specific switch impulse, shifts the cover 3 to the right from its closed position to a position that opens the opening 4 (see FIG. 6). Furthermore, the cover 3 has a rim or crown 55, which surrounds the preparation container 2 concentrically. In this way, it is also possible for the cover 3 to shift when the preparation container 2 is rotated around its axis. For this purpose, the rod assembly 53 is operatively engaged with the rim 55 of the cover 3 via a connecting link 56. In this way, the opening can assume a position as shown in FIG. 5 and can also be rotated by 180°, so that the treated product can be fed downwards, via a funnel 57, as described below, to a collecting container 7.

After the operation of a switch, as shown in FIG. 1, the cover 3 is moved to an open position by means of a driving motor 22 and subsequently, so is the second closing means 19 of the receiving space 26. For this purpose, the closing means 19 is connected, via a control element 21 or an automatic guide and a catch element 58, to the cover 3. The control element 21 has two catch parts 58 and 59 spaced at intervals from each other, between which the catch element 59' of the cover 3 is situated. If, for example, as shown in FIG. 1, the cover 3 is shifted to an open position, that is, to the left, then, after a certain path length, it pushes against the catch element 58 and also carries along the second closing means 19, so that, after a certain time delay, the closing means 19 opens an opening 20. In this way, it is ensured that the French fries are not fed onto the cover 3 but rather into the opening 4 of the preparation container 2. When the closing means 3 is shifted to its closed position, the catch element 59' actuates the closing means 19 via the catch 59, thus bringing it into the closed position.

As shown in FIGS. 1 and 5, the preparation container 2 has a heater or a microwave device 18, by means of which the foods or the French fries can be processed or brought into an edible state. As shown in FIG. 5, the heater 18 is situated on the left-hand side of the container 2. As shown in FIG. 5, the heater 18 is designed as a resistance heater. In order to achieve an optimal distribution of heat, a fan or an axial blower 82 is provided behind the heater 18 and causes the air in the preparation container 2 to be swirled up or circulated. The air is drawn in through a line 86 in order to increase the air pressure and to shorten the cooking time.

To prevent the French fries from clumping together, the preparation container 2 is brought into motion, that is to say, rotated, by means of a drive device 27. For this purpose, the preparation container 2 is placed in a ball-bearing ring 60 and 61 and supported in bearings 61'.

In the preparation of the pre-fried French fries, in order to ensure that they are properly browned and can be prepared crisply, the preparation container 2 is provided with a supply device 28 for water or another substance or liquid. In the embodiment shown in FIG. 5, water is admitted into the interior of the container 2 by means of the supply device 28 during the preparation of the French fries and, at, the same time, an increase in pressure in the container is also ensured. In this way, the processing of the French fries is influenced in a very favorable manner. For this purpose, the supply device 28 is connected to a water container 63 via a pump 62.

As already mentioned, the preparation container 2 is kept in constant motion by means of the drive device 27 during the preparation. In the preparation container 2, there can be numerous stirring and resistance elements that ensure that the French fries are loosened up during the preparation phase, so that they do not clump together.

Figure 7:
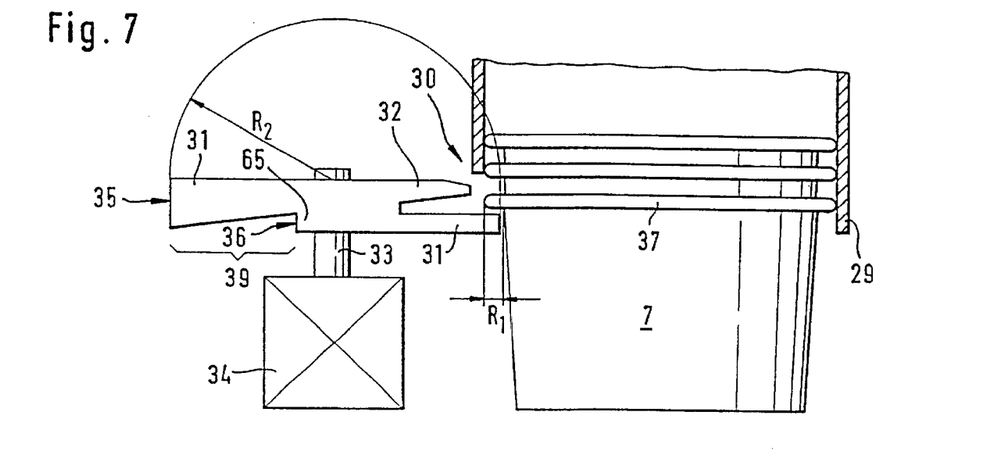
FIG. 7 a device for receiving the collecting containers and for separating one collecting container from the other collecting containers held in a holder, so that an individual collecting container can be passed along to another transport device.
Figure 8:
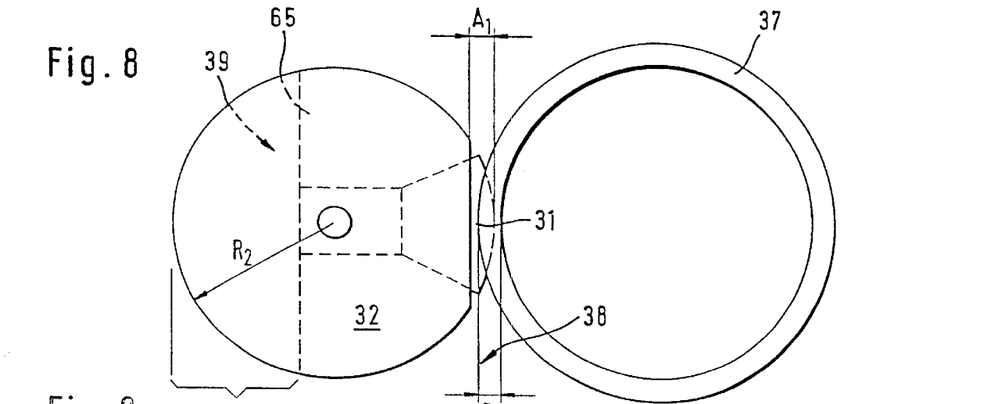
FIGS. 8 and 9 the device for separating a collecting container from the other collecting containers held in a holder.
Figure 9:
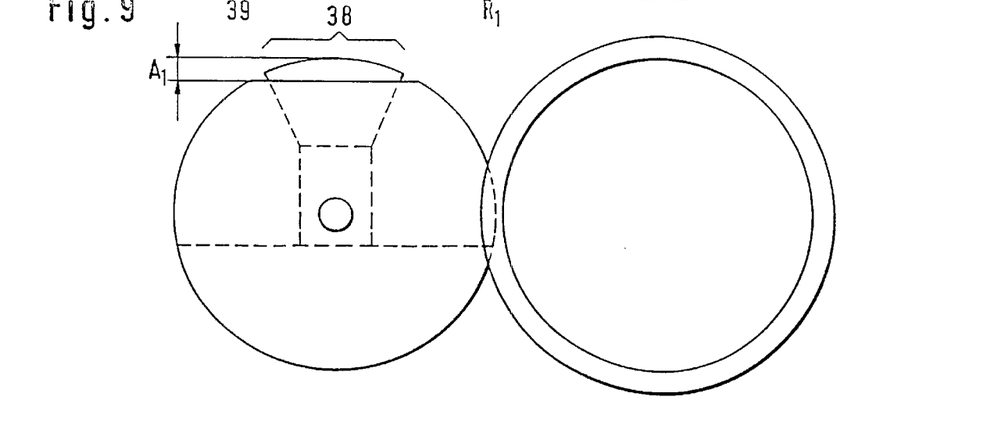

In the preparation container 2, additional sensor elements, not shown in the drawing, can be provided, which signal the status of the processing to a control device, so that, after the final phase of the processing operation has been reached, the closing means 3 can be moved back into the open position again by means of a control device not shown in the drawing, and thereby, at the same time, the opening 4 assumes a position above the funnel 57 and thus above the collecting container 7. In order for a collecting container to be moved into the desired receiving position as shown in FIG. 1 at the appropriate point in time, numerous collecting containers (FIG. 7) are accommodated in a holder 29 or in a container for receiving the collecting containers. The individual collecting containers 7 are arranged in a stacked fashion as shown in FIG. 7. In each case, the lowest collecting container can be removed from this holder 29 and can be placed on a receiving table or a turntable 40. As shown in FIG. 7, the lowest collecting container held in the holder 29 can be removed individually by means of a bucket dispenser. The bucket dispenser consists of the holder 29 and a separating part 32 as well as a holding element 31, which are joined together into a single unit. As shown in FIG. 8, the separating part 32 is cut off in a segment-like manner by the amount $A_1$, so that it is at a slight distance from the rim 37 of the collecting container 7 and does not prevent the collecting container from dropping downwards. Below the separating part 32 is the holding element 31, whose outer rim can be passed under the rim 37 of the collecting container 7. The rim has a size $R_1$ and corresponds to the part $A_1$ of the holding element 31, which can be moved under the rim 37.

The holding element 31 is permanently connected to the separating part 32 of the lower holding element 31 and is arranged on an axis of rotation 33. These parts are rotated by means of a drive device 34. If, as shown in FIG. 7, two joined rotational bodies 35 and 36, having the holding element 31 and the separating part 32, are rotated, then the lower holding element 31 of the rotational body 36 moves away from the rim 37 and releases the lower collecting container 7, since an opposite part is now moved into the area of the rim 37, but does not touch it. Now, the collecting container 7 can drop downwards. In order to ensure that the container 7 falls downward, the upper holding element 31 can be designed with a wedge shape and be passed between the two rims 37 of two collecting containers 7. In this rotational operation, the upper holding element 31 moves, at the same time, under the upper rim 37 of the next collecting container 7 and now holds the lowest collecting container securely. The separating part 32 is then likewise situated on the opposite side of the holding element 31. In this way, it is ensured that, in each case, only the lower collecting container 7 can be removed, whereas the collecting container 7 above is held by the appropriate holding element 31 of the upper or the lower rotational bodies 35 and 36. Therefore, the motor 34 of the bucket dispenser is activated when, in the preparation container 2, the foods have been prepared.

As further shown in FIG. 7, the two rotational bodies 35 and 36 can have a radius $R_2$ and can each have a segment-like section 38 and 39, which makes it possible for either the upper rotational body 35 or the lower rotational body 36 to permit the collecting container 7 to be further moved downwards, so that, in each case, only one collecting container can be removed downwards. For this purpose, it is advantageous for the holding rim 37 to have a width $R_1$, which corresponds approximately to the width $A_1$ of the segment-like section 38 or 39.

Furthermore, it is advantageous for the holding element 31 of the upper rotational body 35 to be offset by an angle of between 45° and 230°, in particular by 180°, in relation to the holding element 31 of the lower rotational body 36.

Once the foods or the French fries have been fully prepared in the preparation container 2, the latter can be moved, by means of the drive device 27, into a position rotated by 180°, in which the opening 4 is situated above the funnel 57, so that the foods can be fed to the collecting container 7 via the funnel 57, and can be moved into the area of a discharge opening 66 of the funnel 57 by means of the receiving table 40, which can be configured as a turntable. However, it is also possible for the receiving table 40 to be provided with conveying elements 81, which move the individual collecting containers 7 along until they arrive below the funnel 57.

As soon as the foods or the French fries have been fully prepared in the preparation container 2, the preparation container 2 can be rotated by 180° and, at the same time, the opening 4 can be opened by the closing means 3. The individual operating cycles follow a time sequence and are controlled by a software program in such a way that the individual operating steps from the introduction of the foods into the container 1 to the discharge into the collecting container 7 are precisely controlled.

Figure 11:
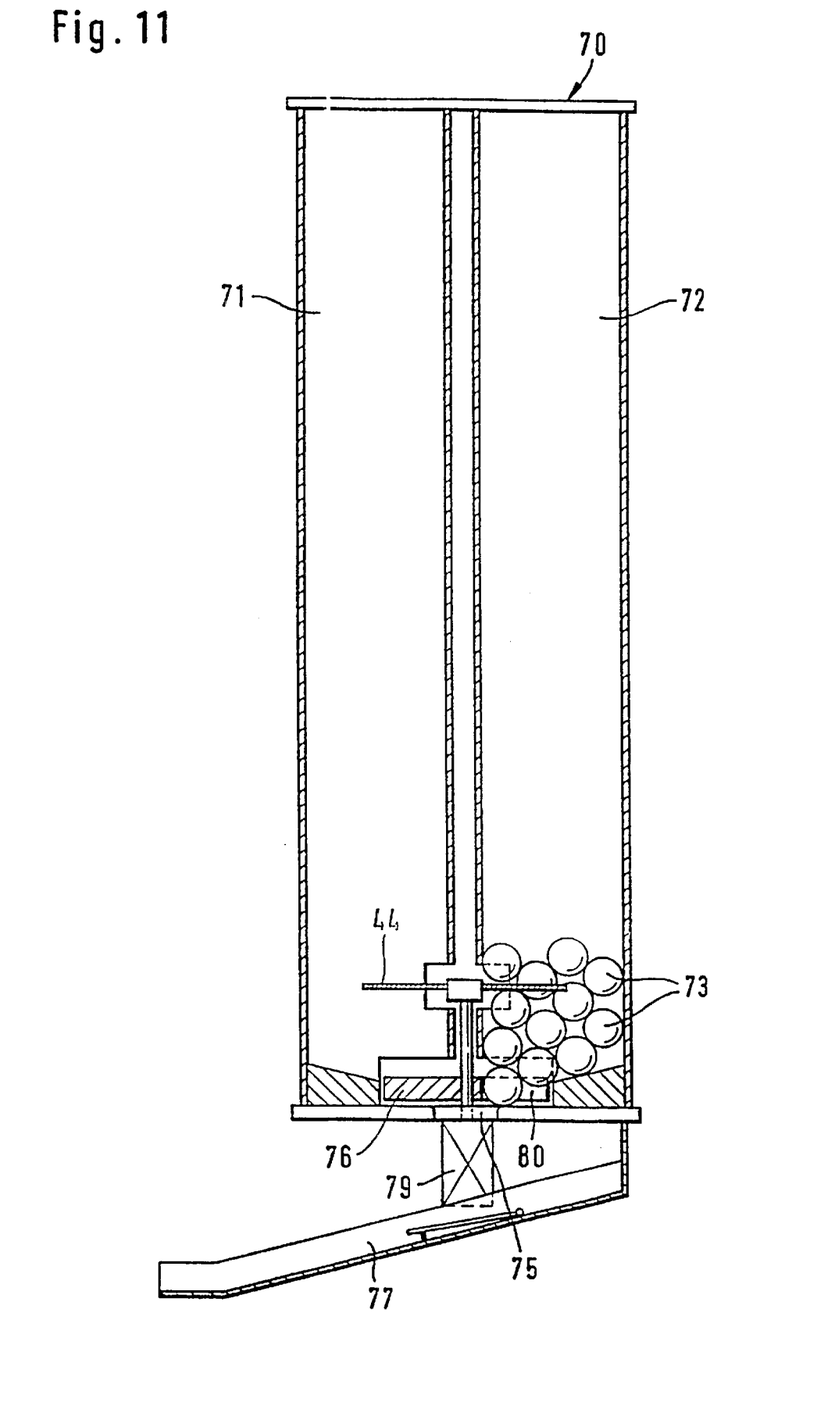
FIG. 11 two receiving containers, arranged next to one another, for receiving additional collecting containers for condiments—for example, seasonings.

In the front area of the funnel 57, there is a second holder 70 or there are two cylinder-shaped housings 71 and 72 with a common discharge opening 75. In the two housings 71 and 72, there are spherical containers 73, which serve to hold condiments, seasonings, mustard, ketchup, or the like. For example, it is possible, in the left-hand housing 71, to provide the container 73 with ketchup and, in the right-hand housing 72, to provide the container 73 with mustard or other seasonings. Depending on which foods are being processed in the preparation container 2, the appropriate condiments can be discharged separately from the housing 71 or 72.

To prevent jamming of the individual containers 73 in the housings 71 and 72, a flexibly configured spring conveying element or separating element or agitating element 44 can be provided in the lower area of the housings 71 and 72, which helps agitate the individual containers 73 and thus prevent them from jamming together and becoming stuck in the housing. In the area of the opening 75 of the housings 71 and 72, there is another conveying element 76, which feeds the containers 73 either from the left-hand housing 71 or from the right-hand housing 72 to the dispensing opening 75, so that the containers 73 can then be discharged via a slide 77.

The separating element or the agitating part 44 is driven by means of a drive device 79. The drive device has a conveying element 76, in which there is a recess 80 into which the containers 73 can be discharged, so that they can then be fed to the dispensing opening 75. For this purpose, the conveying element 76 is moved, by means of the drive device 79, with its cutout either into the left-hand or the right-hand housing 71, 72, it then picks up the container 73 from the housing 71 or 72 in its recess 80, and feeds it to the dispensing opening 75. In this way, it is ensured that, in each case, the desired addition, either mustard or ketchup, can be added to the food.

Figure 10:
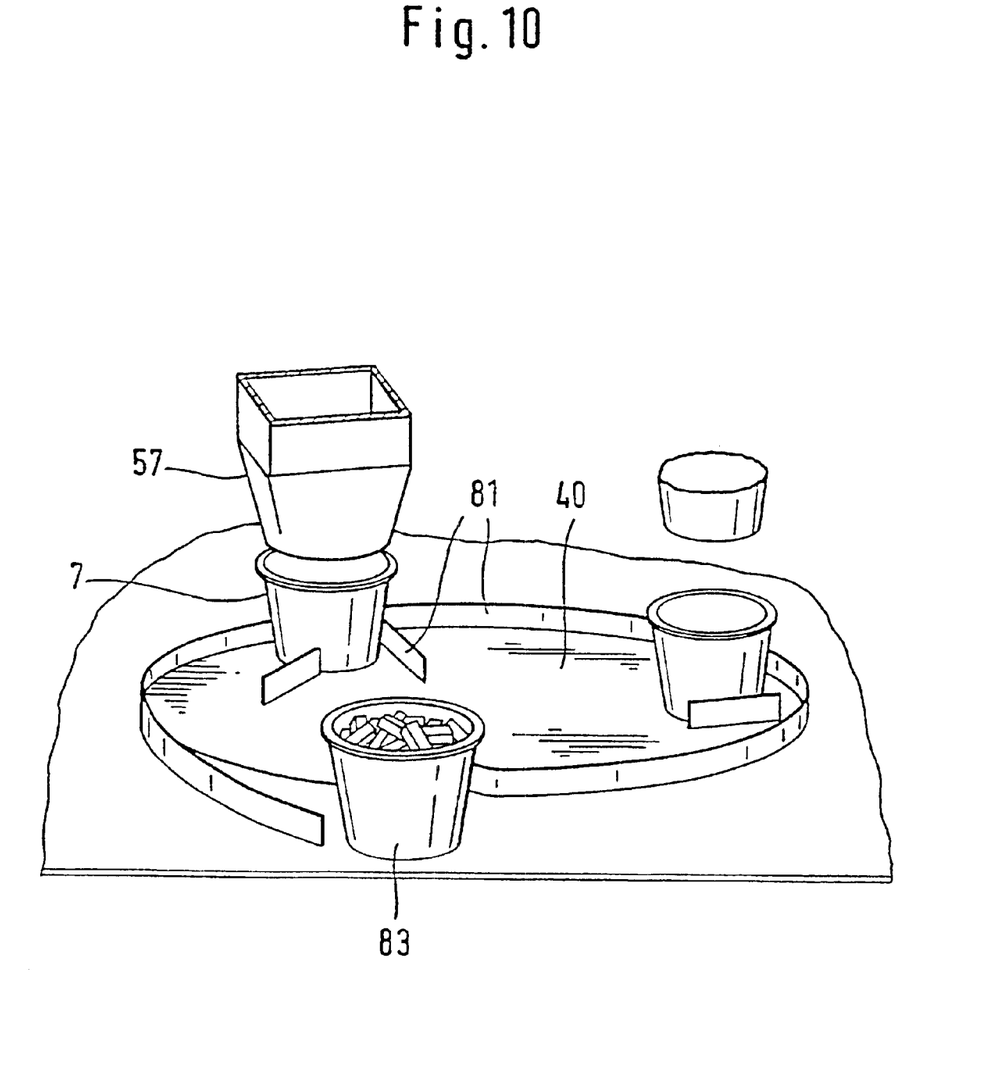
FIG. 10 a receiving table to receive the collecting containers.

The process for the processing of foods is characterized by the following process steps:

The foods or the French fries, received in the storage container 1, are fed, via an outlet opening 47, to the metering device 8, which feeds a specific filling amount, via the outlet opening 20, to the preparation container 2, which can only be shifted to an open position once the closing means 3 of the preparation container 2 has been moved into an open position. The filled container 7 is conveyed, by means of the receiving table 40, into the removal position 83 in FIG. 10 and can then be removed by an operator. Over the further course, another container 7 arrives under the funnel 57. The complete operating cycle is thus ended.

LIST OF REFERENCE NUMERALS 1 storage container
2 preparation container
3 third closing means=cover
4 opening
6 flap
7 collecting container
8 first closing means, metering device, (flap), scales
9 axis
10 lever arm
11 drive device
12 cam wheel
13 connecting piece=rod assembly or spring
14 actuator
15 weight
17 two-position switch
18 heater of microwave device
19 second closing means
20 outlet opening of receiving space 26
21 control element, automatic guide
22 driving motor
23 drive device
24 transport device=conveyor belt
25 insulated housing or refrigerated housing
26 receiving space
27 drive device
28 supply device for water or another substance or liquid
29 holder or a container for receiving the collecting containers
30 discharge opening of the holder 29
31 holding element
32 separating part
33 axis of rotation
34 drive device
35 rotational body
36 rotational body
37 rim
38 segment-like section
39 segment-like section
40 receiving table
41 discharge area
44 separating element or agitating element
45 housing
45' housing
46 funnel-shaped part
47 outlet opening
49 rod assembly
50 drive device
51 spring element
52 wall part
53 rod assembly
54 cam wheel
55 rim or crown
56 connecting link
57 funnel
58 catch element
59 catch element
59' catch element
60 ball-bearing ring
61 ball-bearing ring
61' support
62 pump
63 water container
65 separating part
66 discharge opening of the funnel 57
70 holder
71 housing
72 housing
73 container
75 opening
76 conveying element
77 slide
79 drive device
80 recess
81 conveying element
82 axial blower
83 removal position
86 line

What is claimed is:

1. A device for preparing foods, comprising:
a storage container (1) for storing foods prior to preparation;
a housing provided with an outlet opening (20) associated with said storage container (2);
a first closing means (8) disposed between said storage container and said outlet opening, said first closing means being movable as a function of a control variable or an amount of food between a closed position to block passage of food from said storage container to said outlet opening and an open position to allow passage of food from said storage container to said outlet opening;

a preparation container enclosing a food preparation region and having at least one opening (4);

a second closing means (3) operatively associated with said at least one opening and movable between an open position to allow food to be transferred from said outlet opening into said preparation container and a closed position for placing said food preparation region in a sealed state, except for an air inlet opening;

a pressure-increase device (82, 86) operatively associated with said preparation container and disposed in said air inlet opening for creating a pressure above atmospheric throughout the food preparation region when said second closing means is in the closed position; and a collecting container (7) disposed to receive food from said preparation container.

2. The device according to claim 1, wherein said first closing means (8) is a metering device and serves to portion out food that is fed to said preparation container.

3. The device according to claim 2, wherein said metering device comprises a set of scales having of a flap (6) arranged in a pivoting manner on an axis (9), a lever arm (10) connected to the flap (6) and a drive device (11) connected to the lever arm.

4. The device according to claim 3, wherein the drive device (11) has a cam wheel (12) that is operatively engaged with the lever arm (10) via a connecting piece (13).

5. The device according to claim 4, wherein the connecting piece (13) is a spring element that is operative to shift the flap (6) to an open position when an amount of food having a specific weight is deposited on the flap.

6. The device according to claim 3, further comprising an actuator (14) associated with the first closing means (8) to shift the flap (6) to an opened position in response to a specific filling amount of the food and in response to a control variable resulting from the specific filling amount of the food, and to shift the flap to a closed position after food has been discharged from the flap.

7. The device according to claim 3, wherein the first closing means (8) comprises a lever arm (10) coupled to the flap and a weight (15) corresponding to the specific filling amount of the food carried by the lever arm (10).

8. The device according to claim 7, wherein the first closing means further comprises a two-position switch (17) and a flexible controlling element coupling the lever arm (10) to the switch (17) for activating the switch only when the flap (6) has reached an end position corresponding to the closed position of the first closing means.

9. The device according to claim 1, further comprising a motor coupled to said second closing means (3) for moving said second closing means between the open and closed positions.

10. The device according to claim 1, further comprising an additional closing means interposed between the first and second closing means operatively engaged with said second closing means for moving the additional closing means to a closed position.

11. The device according to claim 10, further comprising a control element (21) coupling the second closing means to the additional closing means.

12. The device according to claim 11, further comprising a driving motor (22) connected to the second closing means (3) and to the additional closing means (19) via a connection that allows play in the movement of the additional closing means relative to the second closing means.

13. The device according to claim 1, further comprising a transport device (24) provided before the first closing means (8), and a drive device (23) operatively engaging the transport device (24) to convey food to the first closing means (8).

14. The device according to claim 13, further comprising an insulated housing or refrigerated housing (25) containing the storage container (1), the first closing means (8) and the transport device (24).

15. The device according to claim 14, wherein the insulated housing or refrigerated housing (25) is associated with a further closing means.

16. The device according to claim 15, wherein there is a receiving space (26) provided between the metering device (8) and the further closing means or the second closing means (19).

17. The device according to claim 11, wherein the second closing means (3) of the preparation container (2) is opened first and then, with a time delay, the additional closing means (19) is opened by the control element (21).

18. The device according to claim 1, wherein that the preparation container (2) can be driven by means of a drive device (27).

19. The device according to claim 1, wherein the preparation container (2) can be heated by a heater.

20. The device according to claim 1, further comprising a drive device (27) coupled to said preparation container (2), said drive device being provided with a control device for influencing the running time and/or the driving speed of the preparation container (2).

21. The device according to claim 1, wherein, after preparation of the food in the preparation container (2), the at least one food transfer opening (4) is automatically opened and the food is emptied into the collecting container (7).

* * * * *